United States Patent [19]

Kitagishi et al.

[11] Patent Number: 5,182,671
[45] Date of Patent: Jan. 26, 1993

[54] VARIABLE MAGNIFICATION OPTICAL SYSTEM HAVING A CAPABILITY OF STABILIZING THE IMAGE

[75] Inventors: Nozomu Kitagishi, Tokyo; Shoichi Yamazaki, Kanagawa, both of Japan

[73] Assignee: Canon Kabushiki Kaisha, Tokyo, Japan

[21] Appl. No.: 407,657

[22] Filed: Sep. 15, 1989

[30] Foreign Application Priority Data

Sep. 19, 1988 [JP] Japan ................................. 3-234093
May 25, 1989 [JP] Japan ................................. 1-132189

[51] Int. Cl.$^5$ ...................... G02B 27/64; G02B 15/14
[52] U.S. Cl. ................................. 359/557; 359/554; 359/675; 359/678
[58] Field of Search ............... 350/417, 419, 476–478, 350/500–506, 423–427; 356/248, 250; 359/554–557, 668–678, 831, 837

[56] References Cited

U.S. PATENT DOCUMENTS

| | | | |
|---|---|---|---|
| 4,639,096 | 1/1987 | Kitagishi et al. | 350/427 |
| 4,818,083 | 4/1989 | Mihara | 350/423 |
| 4,836,661 | 6/1989 | Ikemori | 350/423 |
| 4,844,602 | 7/1989 | Kitagishi et al. | 350/500 |
| 4,854,683 | 8/1989 | Ozawa | 350/427 |
| 5,000,549 | 3/1991 | Yamazaki | 350/500 |

FOREIGN PATENT DOCUMENTS 50-080147 6/1975 Japan.
56-021133 5/1981 Japan.
61-223819 10/1986 Japan.

OTHER PUBLICATIONS

U.S. Pat. Application Ser. No. 07/261/231–Oizumi et al. filed on Oct 24, 1989.
Modern Optical Engineering–Chapters 4 and 9–Smith, McGraw-Hill Book Company, 1966.

*Primary Examiner*—Bruce Y. Arnold
*Assistant Examiner*—Thong Nguyen
*Attorney, Agent, or Firm*—Fitzpatrick, Cella, Harper & Scinto

[57] ABSTRACT

An image stabilization optical system for use in the variable magnification optical system having a first lens group followed rearwardly by a zoom section comprising a plurality of lens groups is disclosed, wherein as at least one lens group in the zoom section is made to be a compensating lens group, the optical action of each lens group is properly specified so that if the tilting of the optical system is the same, the amount of compensation movement of the compensating lens group becomes always the same regardless of the image magnification varying position.

9 Claims, 12 Drawing Sheets

VARIABLE MAGNIFICATION OPTICAL SYSTEM HAVING A CAPABILITY OF STABILIZING THE IMAGE

BACKGROUND OF THE INVENTION

1. Field of the Invention

This invention relates to devices for preventing the image from being shaken by unexpected vibrations and, more particularly, to optical systems of the zoom type which optically stabilize the image.

2. Description of the Related Art

If the photographer intends to take pictures while riding in a running car, flying aircraft, or other moving vehicle, he will suffer from vibrations propagating to the photographic system. Particularly when the exposure time is long, the taken picture has a largely shaken image.

In the past, image stabilization optical systems having the capability of preventing a shake of an image to be shot have been proposed in, for example, Japanese Laid-Open Patent Application No. Sho 50-80147, Japanese Patent Publication No. Sho 56-21133 and Japanese Laid-Open Patent Application No. Sho 61-223819.

In Japanese Laid-Open Patent Application No. Sho 50-80147, the zoom lens has two afocal variable magnification systems, wherein the image magnification is varied by using either of the two variable magnification systems in such a way as to have the relationship: $M_1 = 1 - (1/M_2)$ where $M_1$ is the angular magnification of the first variable magnification system and $M_2$ is the angular magnification of the second variable magnification system, whereby the second variable magnification system is spatially fixed so as to compensate for a shake of the image. Thus, stabilization of the image is achieved.

In the Japanese Patent Publication No. Sho 56-21133, the vibratory state of the optical instrument is detected by a detecting means and the output signal from the detecting means is used to stabilize the image in such a way that part of the optical system, or an optical member, is moved in a direction to cancel the vibratory displacement of the image.

In the Japanese Laid-Open Patent Application No. Sho 61-223819, the photographic system is constructed with inclusion of a refraction type variable angle prism arranged at the frontmost position so that as the photographic system vibrates, the vertex angle of the refraction type variable angle prism is made to vary to deflect the image. Thus, good stability of the image is achieved.

In general, with respect to the mechanism which vibrates part of the photographic system, or a lens group, to compensate for the image shake from the intended line of sight to obtain a stationary picture, there is requirement for a photographic system of so simple a form that the relationship between the amount of compensation for the image shake and the amount of movement of the compensating lens is simplified, and the time it takes to compute the transformation is reduced to a minimum.

However, in the variable magnification optical system, the amount of image shake (image deflection) $\Delta Y$ on the image plane relative to the angle of inclination $\theta$ of the variable magnification optical system becomes large in proportion to the magnification varying position, i.e., the focal length. Also, the ratio of the amount of image shake $\Delta Y$ to the amount of decentering E of the compensating lens in the direction vertical to the optical axis, i.e., the decentering sensitivity S, will differ with different magnification varying positions.

Where the so-called zoom section having one of the lens groups arranged behind the first lens group changes its magnifying power during the variation of the image magnification and is used in part as a compensating lens group, minimization of the size of the whole lens system becomes easier. However, the required amount of decentering E of the compensating lens group relative to the amount of image shake $\Delta Y$ varies to a large extent according to the function of the magnification varying position. For this reason, there is a problem that the structure of the image stabilization system becomes complicated.

As a related art of the invention, there is U.S. patent application Ser. No. 261,231 filed on Oct. 24, 1988.

SUMMARY OF THE INVENTION

A first object of the invention is to provide a zoom lens capable of stabilizing the image.

A second object is to provide a zoom lens having a compensating optical system for stabilizing the image that is arranged in the magnification varying section thereof, wherein regardless of the magnification varying position, the amount the compensating optical system is driven can be made almost constant.

When the present invention is applied to a variable magnification optical system whose variable magnification section is comprised of a plurality of lens groups arranged behind the first lens group, a feature is that at least one of the lens groups in the variable magnification section is made to be a compensating lens group. Further, the optical action of each lens group is set so appropriately that if the inclination of the variable magnification lens group is the same, the required amount of movement for compensation of the compensating lens group becomes always the same regardless of the magnification varying position. This produces an advantage of simplification of the structure of the operating mechanism for the compensating lens group.

DETAILED DESCRIPTION OF THE PREFERRED EMBODIMENTS

Figure 1:
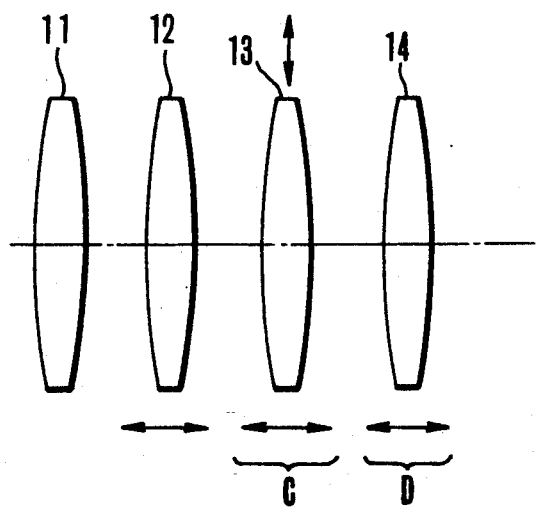
FIG. 1 is a schematic view of an embodiment of the invention, illustrating the optical arrangement of a variable magnification optical system.

FIG. 1 schematically shows the optical arrangement of one embodiment of the variable magnification optical system according to the invention.

In the same figure, the optical system comprises a first lens group 11 which is stationary during variation of the image magnification and a plurality of lens groups 12, 13 and 14 axially movable for varying the image magnification which constitute a zoom section. As a compensating lens group C, use is made of the lens group 13 whose image magnification varies during the zooming. The image shake resulting from the inclination of the variable magnification optical system is compensated for by moving the lens group 13 in a direction perpendicular to the optical axis, or by tilting it a predetermined angle relative to the optical axis, that is, by carrying out the so-called decentering movement.

Next, taking an example of the zoom lens having such a capability of stabilizing the image, the principle concerning the invention is explained.

When the variable magnification optical system inclines an angle $\theta$, the amount of image shake $\Delta Y_0$ on the image plane in a reference state (in a first zoom position), for example, at a wide-angle end, is given by the following expression:

$$Y_0 = F_0 \cdot \tan \theta$$

where $F_0$ is the focal length of the entire system in the reference state.

When the entire system varies the image magnification to have a certain focal length F (in a second zoom position), the amount of image shake $\Delta Y$ relative to the same angle of inclination $\theta$ on the image plane becomes as follows:

$$\Delta Y = F \cdot \tan \theta$$

Using the zoom ratio Z and putting $Z = F/F_0$, $$\Delta Y = Z \cdot F_0 \cdot \tan \theta$$

is obtained. Here even when the angle of inclination $\theta$ is the same, the amount of image shake $\Delta Y$ on the image plane becomes Z times that in the reference state. Meanwhile, when a certain lens group is decentered by a minute value in a direction perpendicular to the optical axis, the ratio of the amount of image deflection to the amount of decentering, i.e., the decentering sensitivity S, varies with variation of the focal length of the entire system. The decentering sensitivity $S_0$ in the reference state and the decentering sensitivity S in the state having the focal length F are expressed respectively as follows:

$$S_0 = (1 - \beta_{C0}) \beta_{D0}$$

$$S = (1 - \beta_C) \beta_D$$

where $\beta_{C0}$ and $\beta_C$ are the image magnifications of the compensating lens group in the reference state and in the focal length F state respectively, and $\beta_{D0}$ and $\beta_D$ are the image magnifications of the lens group D arranged on the image plane side of the compensating lens group in the reference state and in the focal length F state respectively.

Here, the required amounts $E_0$ and E of decentering of the compensating lens group for compensating for the above-described amounts $\Delta Y_0$ and $\Delta Y$ of image shake, respectively, are obtained by:

$$E_0 = \Delta Y_0 / S_0 = F_0 \cdot \tan \theta / (1 - \beta_{C0}) \beta_{D0}$$

$$E = \Delta Y / S = Z \cdot F_0 \cdot \tan \theta / (1 - \beta_C) \beta_D$$

Therefore, in order that when the angle of inclination of the variable magnification optical system by the camera shake or the like is the same angle, the amount of decentering E of the compensating lens group is made always the same despite variation of the focal length of the entire system, each lens group may be formed so as to satisfy the following relationship:

$$(1 - \beta_{C0}) \beta_{D0} = (1 - \beta_C) \beta_D / Z$$

Even if actually this relationship has an error of about 20%, the mechanism for reading the information of the focal length and the computing mechanism can be constructed in a very simple form with tolerances, too, that are not necessary to be high. Hence, the following condition is obtained:

$$0.8 < \frac{(1 - \beta_{D0}) \cdot \beta_{D0} \cdot Z}{(1 - \beta_C) \cdot \beta_D} < 1.2 \qquad (1)$$

The compensating lens group and the fixed lens group which is stationary on the image plane side of the compensating lens group relative to the decentering movement may be designed so that their image magnifications are satisfied likewise with the inequalities of condition (1).

It is to be noted that when the lens group D is not arranged in the variable magnification optical system, the image magnifications $\beta_{D0}$ and $\beta_D$ of the lens group D each may be taken at $$\beta_{D0} = \beta_D = 1$$

and the above-described inequalities of condition (1) may otherwise be set forth as follows:

$$0.8 < \frac{(1 - \beta_{C0}) \cdot Z}{1 - \beta_C} < 1.2$$

Next, a concrete construction and arrangement of the lenses of the variable magnification optical system according to the invention is described.

Figure 2:
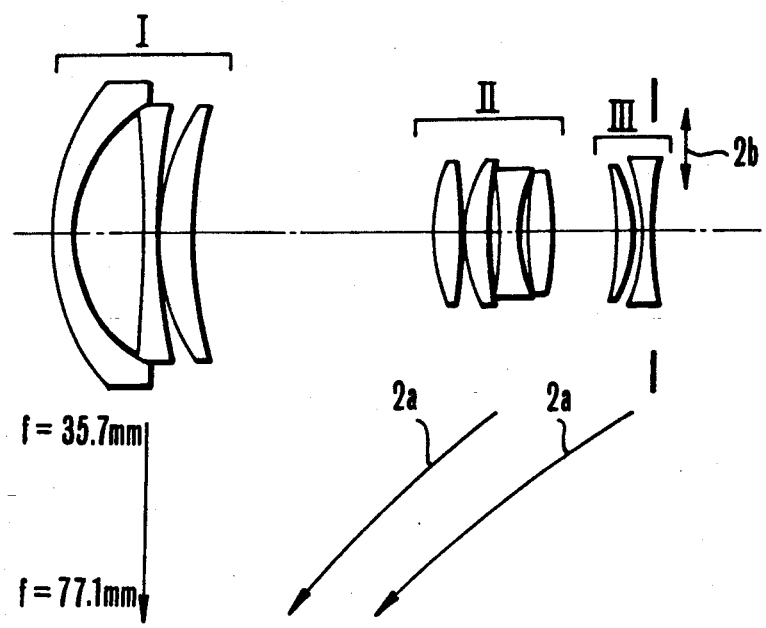
FIG. 2 to FIG. 4 are block diagrams of numerical examples 1 to 3 of lenses of the invention respectively.

FIG. 2 is a longitudinal section view of a numerical example 1 of a lens to be described later of the invention. In the same figure, a reference numeral I denotes a first lens group of negative refractive power, another reference numeral II denotes a second lens group of positive refractive power, and another reference numeral III denotes a third lens group of negative refractive power.

In the present embodiment, the variation of the image magnification from the wide-angle end to the telephoto end is carried out by moving the second lens group and the third lens group as indicated by arrows 2a. Also, the third lens group is used as a compensating lens group and made to move in the direction perpendicular to the optical axis as indicated by an arrow 2b to compensate for the image shake.

In the present embodiment, when the variable magnification optical system tilts, for example, $\frac{1}{8}°$, the compensating lens group, i.e., third lens group is moved in a range of 0.3105–0.3542 (mm) for decentering in a direction perpendicular to the optical axis. With this, the image shake can be compensated for in an error of 13° at maximum throughout the entire range of variation of the magnification.

Figure 3:
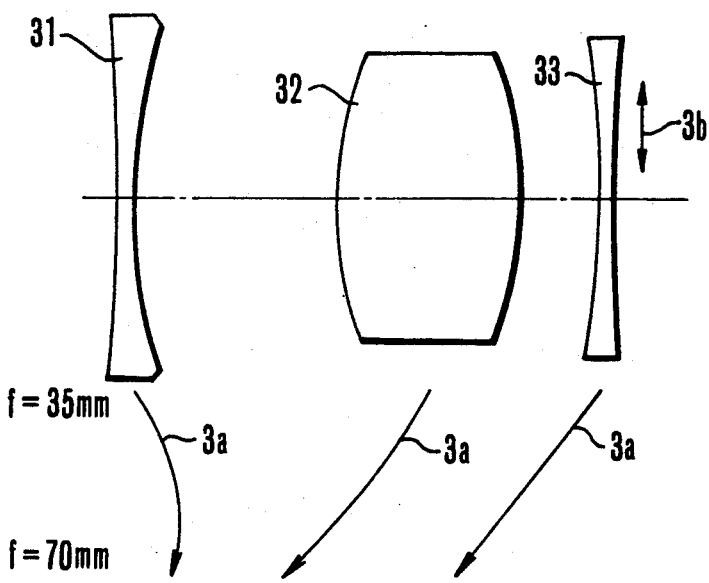
Figure 4:
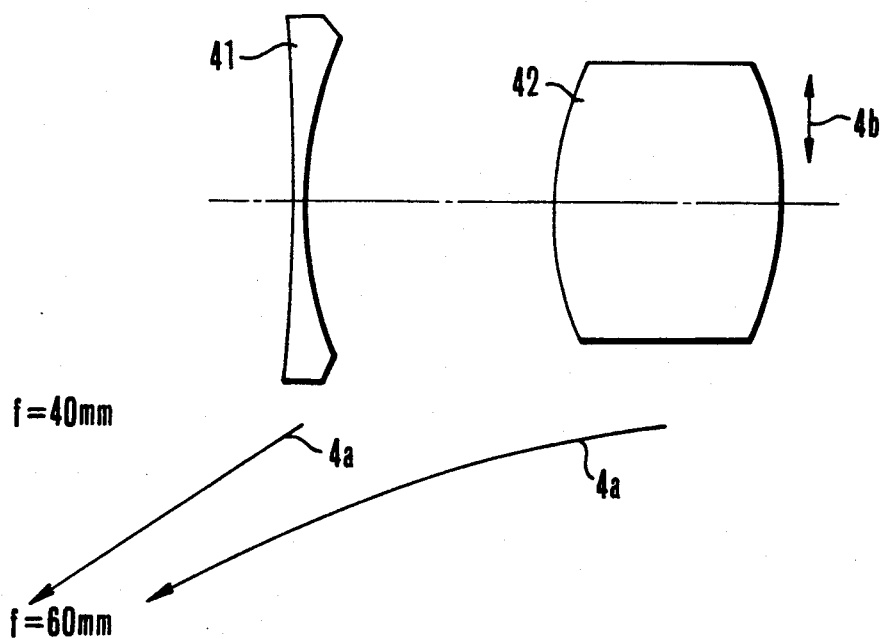
Figure 5A:
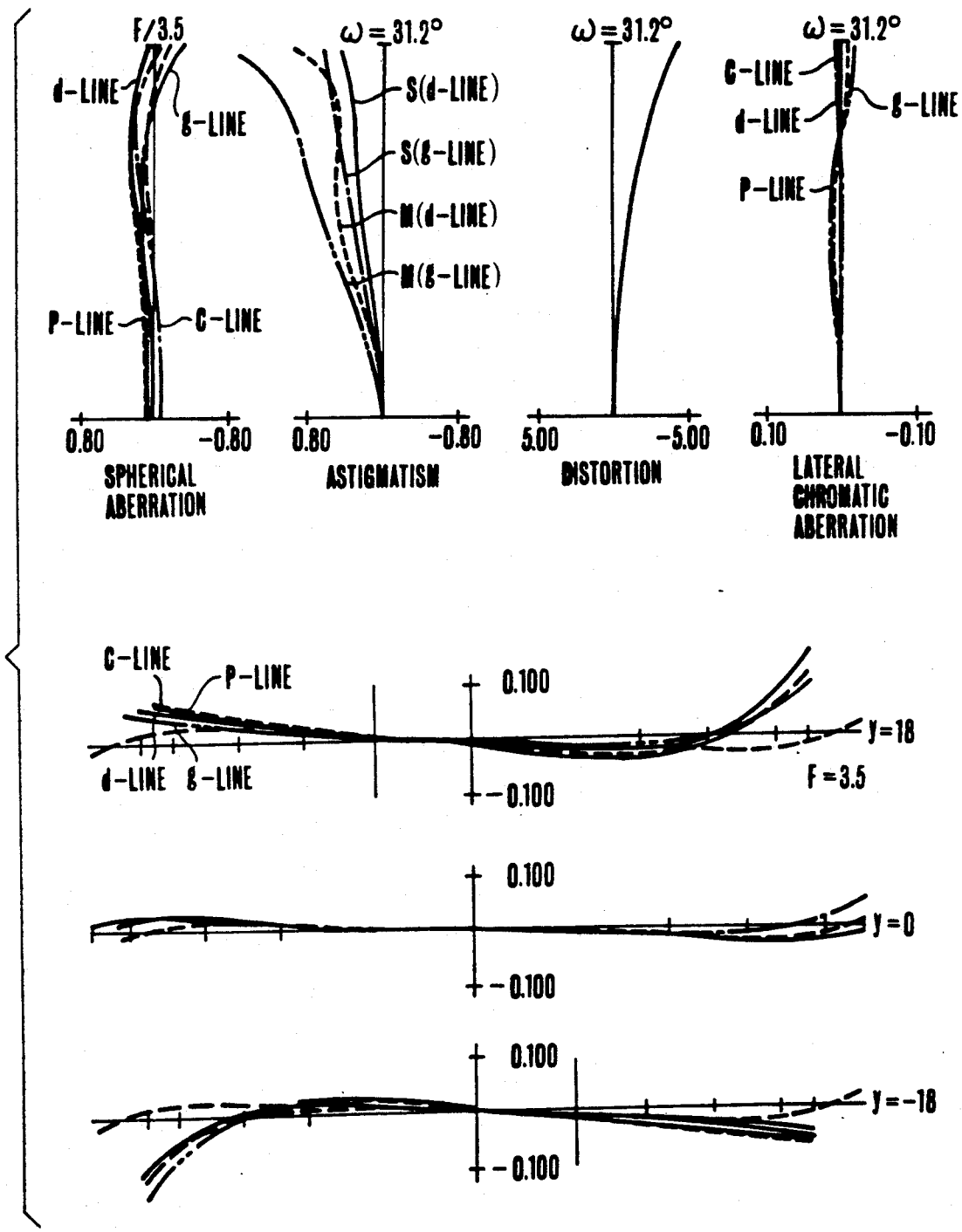
FIGS. 5(A), 5(B), 5(C) and 5(D) are graphic representations of the aberrations of the numerical example 1 of the invention, with FIG. 5(A) in the wide-angle end, FIG. 5(B) in the telephoto end, FIG. 5(C) in the wide-angle end when the image shake is compensated for by the compensating lens group and with FIG. 5(D) in the telephoto end when the image shake is compensated for by the compensating lens group where y represents the image height.
Figure 5B:
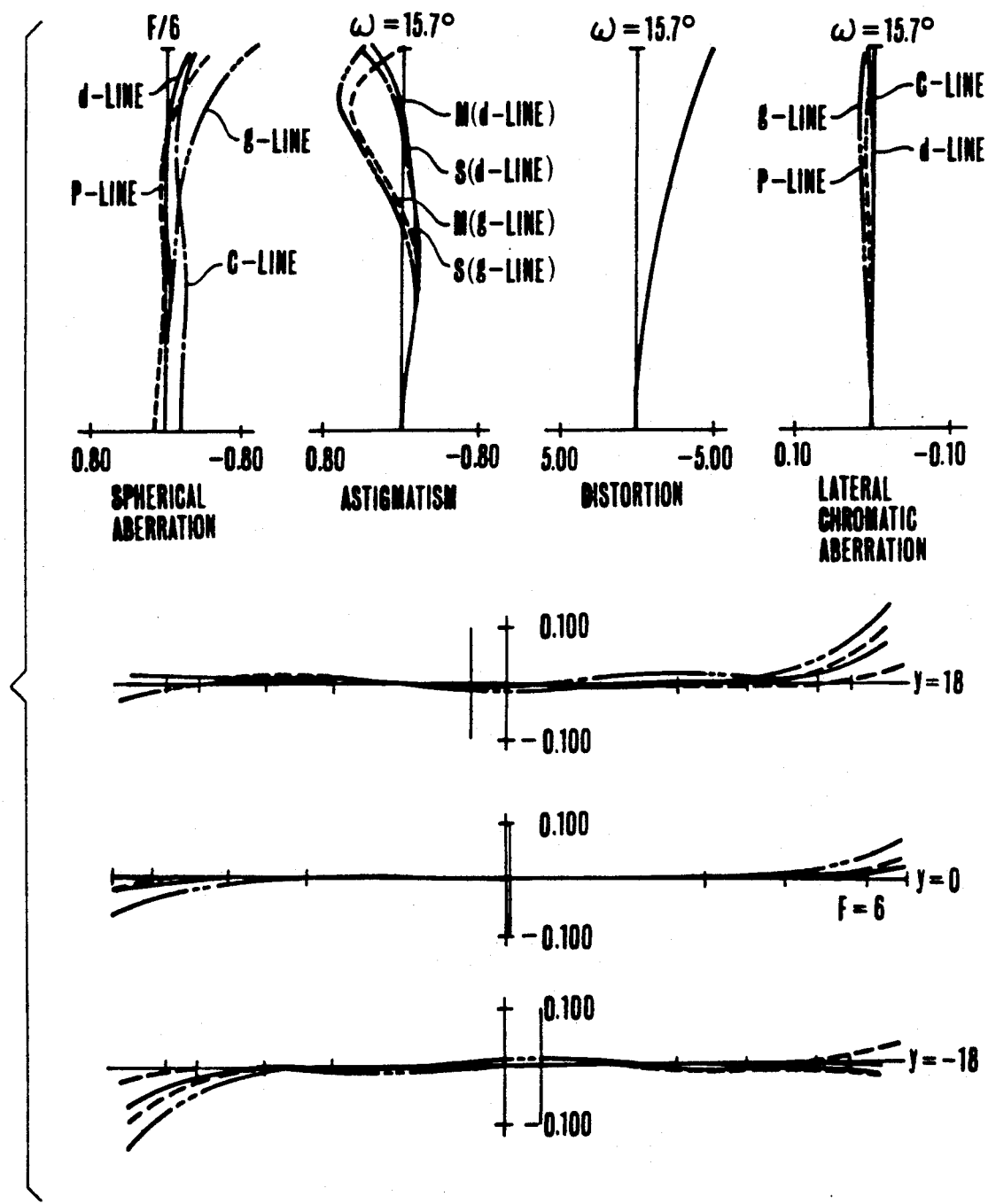
Figure 5C:
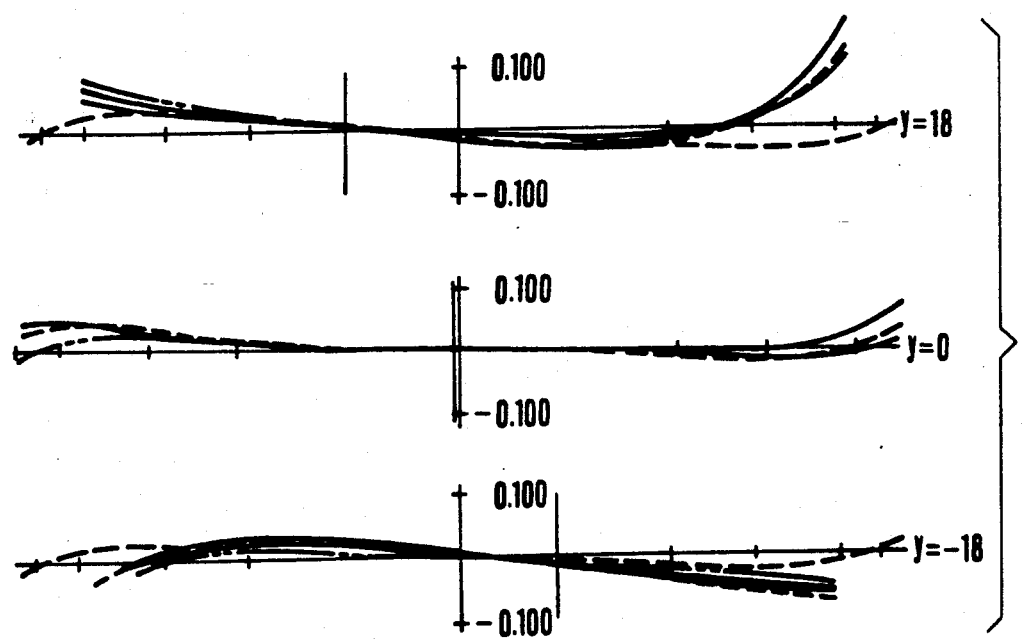
Figure 5D:
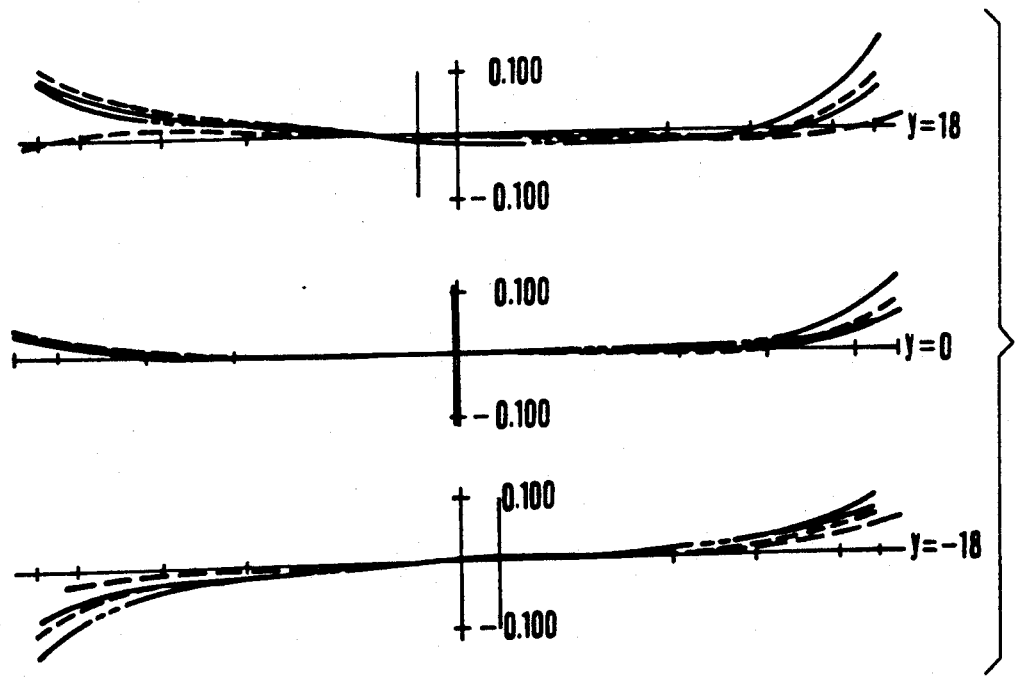

FIG. 3 and FIG. 4 are schematic views of the construction and arrangement of the lenses of practical examples 2 and 3 of specific variable magnification optical systems according to the invention respectively.

In FIG. 3, the system comprises a first lens group 31 of negative refractive power, a second lens group 32 of positive refractive power and a third lens group 33 of negative refractive power. The first, second and third lens groups are moved as indicated by arrows 3a to effect the varying of the image magnification from the wide-angle end to the telephoto end. Also, the third lens group is made to be a compensating lens group so that it moves in directions perpendicular to the optical axis as indicated by arrows 3b to compensate for the image shake.

The variable magnification optical system according to the present embodiment has its power arrangement made so that the decentering sensitivity of the compensating lens group 33 is proportional to the ratio of the focal length to the shortest focal length of the entire system (zooming ratio). By this, at all focal lengths, the image shake resulting from the tilting of the entire system to, for example, 1° is compensated for by the decentering movement of the third lens group by −1.2219 in the direction perpendicular to the optical axis.

In the present embodiment, the lens groups for varying the image magnification are arranged on the object side of the compensating lens group in order that the compensation for the image shake occurring due to the same angle of tilting is performed by exactly the same value of the decentering movement of the compensating lens group over the entire range of focal lengths. Hence, it is made unnecessary to correct the amount of decentering movement in each focal length.

In FIG. 4, the system comprises a first lens group 41 of negative refractive power and a second lens group 42 of positive refractive power.

In the present embodiment, as indicated by arrows 4a, both lens groups, while simultaneously reducing the spacing between both lens groups, are moved to the object side when the image magnification is varied from the wide-angle end to the telephoto end. Also, the second lens group is made to be a compensating lens group so that it moves for decentering in directions perpendicular to the optical axis as indicated by arrows 4b to compensate for the image shake.

In the present embodiment, when the variable magnification optical system tilts, for example, 1°, the compensating lens group is moved in a range of 0.2793–0.3222 (mm) for decentering. With this, the image shake is compensated for over the entire range of variation of the image magnification in an error of 15% at maximum.

Figure 6:
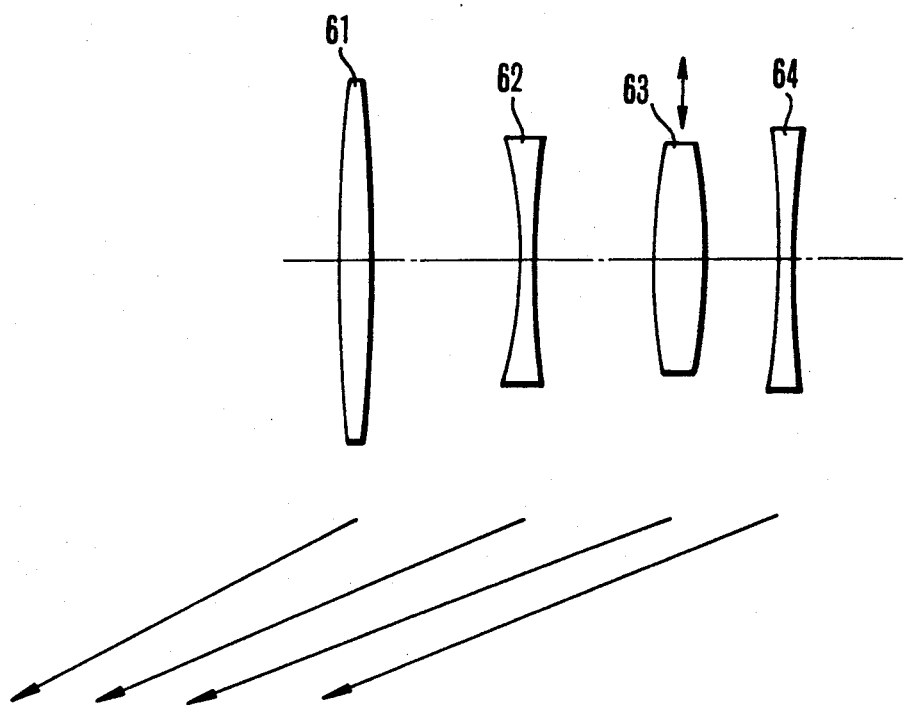
FIG. 6 is a diagram of the refractive power arrangement of a numerical example 4 of the invention.

FIG. 6 is a schematic view illustrating another embodiment of the variable magnification optical system according to the invention.

In the same figure, the system is constructed with a positive first lens group 61, a negative second lens group 62, a positive third lens group 63 and a negative fourth lens group 64. When varying the image magnification from the wide-angle end to the telephoto end, the first to fourth lens groups are moved in respective different loci from one another.

In the present embodiment, the image shake compensating optical system operates in such a manner that the decentering movement of the third lens group 63 serving as an image shake compensating lens group in directions perpendicular to the optical axis is controlled in accordance with the output of an image shake detecting device (not shown). In the present embodiment, a power arrangement is made to satisfy the following formula in the above-described inequalities of condition (1):

$$\{(1-\beta_{C0})\cdot\beta_{D0}\cdot Z\}/\{(1-\beta_C)\cdot\beta_D\} = 1$$

For example, suppose the camera shake tilts 1° the optical system, the amount of driving for compensation of the compensating lens group 63 remains the same at 0.4364 over the entire focal length range. Hence, there is no need to correct the amount of driving as the focal length varies.

Figure 7A:
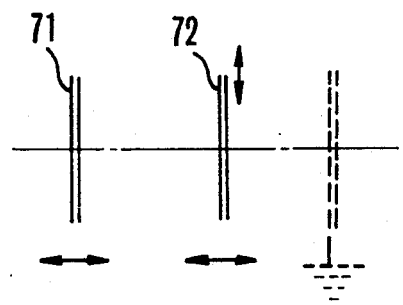
FIGS. 7(A), 7(B) and 7(C), FIGS. 8(A), 8(B) and 8(C) and FIG. 9 are diagrams of the refractive power arrangement of variable magnification optical systems according to the invention.

It should be noted that when applying the invention to a zoom lens having two constituent lens groups movable for zooming as shown in FIG. 7(A) (which may be provided, in its rear, a fixed lens stationary during the zooming), in an image stabilization optical system in which the second lens group is made to be a compensating lens group 72 so that it decenters in directions perpendicular to the optical axis to compensate for the image shake, letting a focal length at the most wide-angle end of focal lengths at which the image shake is compensated for be denoted by $F_\theta$, the image magnification of the second lens group at the most wide-angle end by $\beta_{2\theta}$, a focal length at the most telephoto end by $F_T$ and the image magnification of the second lens group at the most telephoto end by $\beta_{2T}$, and putting $F_T/F_\theta = Z_{T\theta}$, the value of the image magnification of the second lens group at the most telephoto end is chosen so as to satisfy the following condition:

$$-\frac{0.2}{Z_{T\Theta} - 1.2} < \frac{1}{\beta_{2T}} < \frac{0.2}{Z_{T\Theta} - 0.8} \quad (Z_{T\Theta} > 1)$$

so that the correction of the amount of driving due to the zooming can be simplified.

Figure 7B:
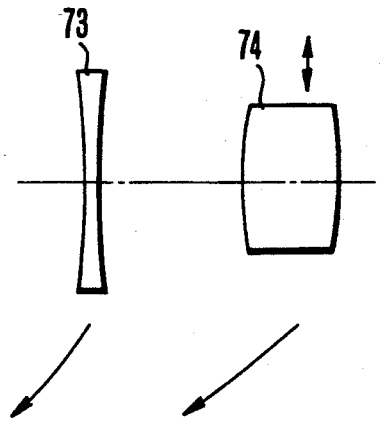

Also, in another zoom lens shown in FIG. 7(B) comprising a negative lens group 73 and a positive lens group 74 arranged in this order from the front (which may be provided on its image plane side with a fixed lens), of the inequalities described above, the magnification $\beta_{2T}$ may be chosen so as to satisfy the following condition:

$$-\frac{0.2}{Z_{T\Theta} - 1.2} < \frac{1}{\beta_{2T}} \quad (Z_{T\Theta} > 1)$$

For example, when $Z_{T\theta} = 2$, the magnification $\beta_{2T}$ may be chosen at a smaller value than −4 (because of the negative sign, its absolute value is larger than 4).

Figure 7C:
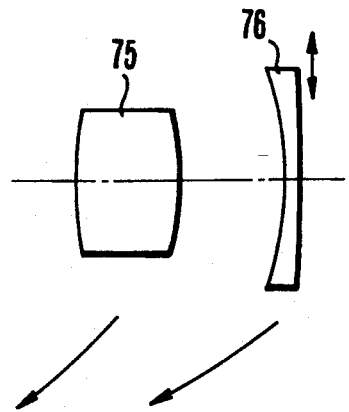

Meanwhile, in a zoom lens shown in FIG. 7(C) having a positive lens group 75 and a negative lens group 76 arranged in this order from the front (which may be provided on its image plane side with a fixed lens group), of the inequalities described above, the magnification $\beta_{2T}$ may be chosen so as to satisfy the following condition:

$$\frac{1}{\beta_{2T}} < \frac{0.2}{Z_{T\Theta} - 0.8} \quad (Z_{T\Theta} > 1)$$

For example, when $Z_{T\Theta}=2$, the magnification $\beta_{2T}$ may be chosen at a larger value than 6.

Figure 8A:
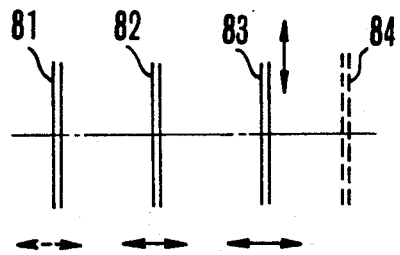
Figure 8B:
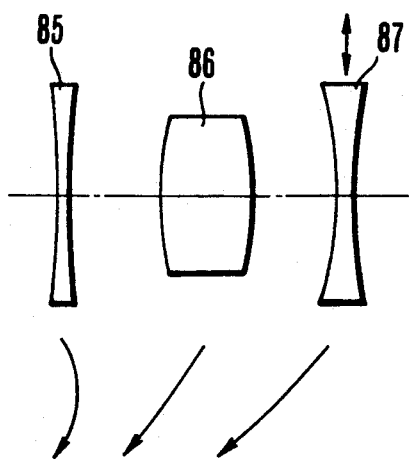

As shown in FIG. 8(A), a first lens group 81 (which may either move or remain stationary during the zooming) and second and third lens groups 82 and 83 for varying the image magnification during the zooming constitute a zoom lens (on the image plane side of which an additional fixed lens 84 may be arranged). From this zoom lens, by using the third lens group 83 as a compensating lens group movable in directions perpendicular to the optical axis, an image stabilization optical system is derived wherein if the power arrangement is made so as to satisfy the following conditions:

$$\beta_{3T} = 1 - Z_{T\Theta}(1 - \beta_{3\Theta})$$

$$\beta_{2T} = \frac{Z_{T\Theta}\,\beta_{2\Theta}\,\beta_{3\Theta}}{1 - Z_{T\Theta}(1 - \beta_{3\Theta})}$$

where $\beta_{3\Theta}$ and $\beta_{3T}$ are the image magnifications of the third lens group in the wide-angle end and the telephoto end respectively, the correction of the amount of driving due to the focal length is unnecessary at all. Also, even if the discrepancies from these two equations are up to about 20%, the correction of the amount of decentering due to the focal length will be simplified. FIG. 8(B) is an example of such a configuration. What are shown in the numerical examples 1 and 2 correspond to this configuration.

Figure 8C:
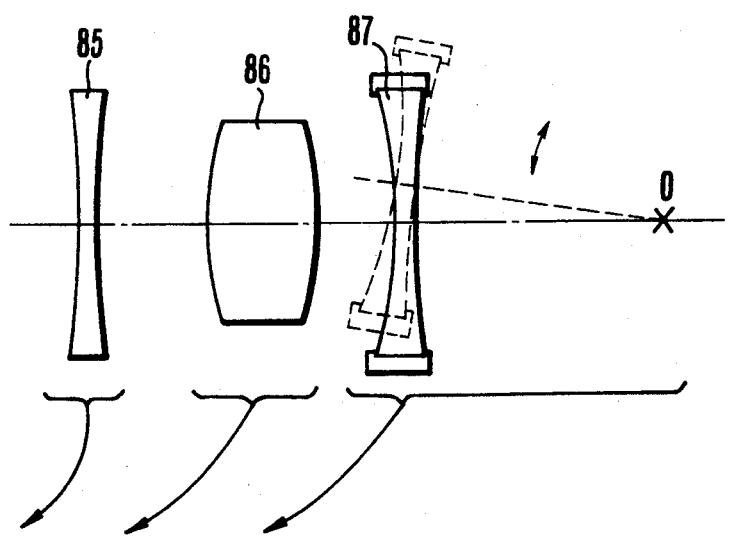

It is to be noted that in the present embodiment, as shown in FIG. 8(C), the third lens group 87 serving as the compensating lens group may otherwise be arranged to be able to tilt about a predetermined center of rotation O when it is driven to decenter to compensate for the image shake. What is of such a structure as to tilt about the center of rotation O has a merit that the holding mechanism and the driving mechanism become simple.

The compensating lens group 87 may be driven in one case by an actuator such as a voice coil which is driven by a signal from an image shake detector for detecting the image shake. In another case, either a gyro may be directly connected to the compensating lens group 87, or a counter balance may be mounted on the opposite side of the center of rotation O to the compensating lens group, so that the compensating lens group is spatially fixed against vibrations of the optical system.

Figure 9:
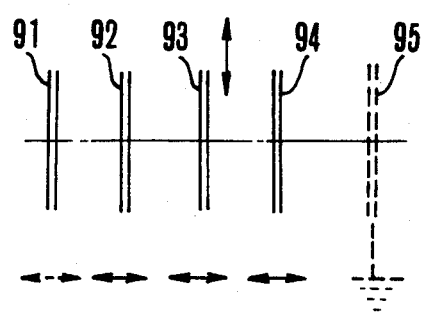

Besides these, as shown in FIG. 9, a first lens group 91 (which may either move or remain stationary during the zooming), second, third and fourth lens groups 92, 93 and 94 whose image magnifications vary with the zooming can constitute a zoom lens (which may further includes a fixed lens group on the image plane side). In an image stabilization optical system derived from this zoom lens by making movable the third lens group as the compensating lens group in directions perpendicular to the optical axis, if such a power arrangement as to satisfy the following condition:

$$|\beta_{2\Theta}| > |\beta_{2T}|$$

is employed, a change of the amount of driving of the compensating lens group resulting from the change of the focal length can be more minimized. As an example of the zoom lens of this type, there is given a numerical example 4. In the type of FIG. 9, if as the number of groups in the zoom lens increases, the second lens group is constructed as replaced by two lens sub-groups for varying the image magnification, namely, a first lens sub-group and a second lens sub-group, the above-described inequality may be applied by regarding $\beta_{2\text{-}1\Theta} \cdot \beta_{2\text{-}2\Theta}$ as $\beta_{2\Theta}$, and $\beta_{2\text{-}1T} \cdot \beta_{2\text{-}2T}$ as $\beta_{2T}$. Even in another case where the fourth lens group is divided into two or more lens sub-groups for varying the image magnification, the same thing is applied to this case.

Next, numerical examples 1 to 4 of the invention are shown. In the numerical example 1, Ri is the radius of curvature of the i-th lens surface counting from front, Di is the i-th lens thickness or air separation counting from front, and Ni and $\nu i$ are respectively the refractive index and Abbe number of the glass of the i-th lens counting from front.

In the numerical examples 2, 3 and 4, fi is the focal length of the i-th lens group, and ei is the interval between the principal points of the i-th lens group and (i+1)st lens group.

Also, the amount of image shake $\Delta Y$ owing to the inclination due to the camera shake in magnification varying positions and the required amount of decentering at that time of the compensating lens group are also shown for reference.

Though these examples have been shown in connection with a case where the compensating lens group is moved in parallel, the decentering may otherwise be carried out by tilting it while simultaneously moving it in parallel.

| Numerical Example 1: | | | | | |
|---|---|---|---|---|---|
| | F = 35.7–77.1 | | FNO = 1:3.5–6.0 | $2\omega$ = 31.3°–62.4° | |
| First Lens Group | R1 = 28.45 | D1 = 2.00 | N1 = 1.74400 | $\nu 1$ = 44.8 | |
| | R2 = 16.78 | D2 = 8.36 | | | |
| | R3 = −193.31 | D3 = 1.70 | N2 = 1.74400 | $\nu 2$ = 44.8 | |
| | R4 = 73.59 | D4 = 0.15 | | | |
| | R5 = 25.41 | D5 = 3.80 | N3 = 1.72825 | $\nu 3$ = 28.5 | |
| | R6 = 57.53 | D6 = Variable | | | |
| Second Lens Group | R7 = 22.71 | D7 = 3.20 | N4 = 1.60311 | $\nu 4$ = 60.7 | |
| | R8 = −88.82 | D8 = 0.36 | | | |
| | R9 = 16.93 | D9 = 2.80 | N5 = 1.51633 | $\nu 5$ = 64.1 | |
| | R10 = 55.08 | D10 = 1.12 | | | |
| | R11 = −72.31 | D11 = 2.65 | N6 = 1.84666 | $\nu 6$ = 23.9 | |
| | R12 = 15.21 | D12 = 0.88 | | | |
| | R13 = 28.77 | D13 = 3.50 | N7 = 1.72825 | $\nu 7$ = 28.5 | |
| | R14 = −31.59 | D14 = Variable | | | |
| Third | R15 = −42.12 | D15 = 2.05 | N8 = 1.58347 | $\nu 8$ = 30.2 | |
| | R16 = −15.99 | D16 = 1.29 | | | |

-continued

| Lens Group | R17 = −19.01 | D17 = 1.00 | N9 = 1.65844 | ν9 = 50.9 |
|---|---|---|---|---|
| | R18 = 42.92 | | | |
| | R19 = 0.0 | | | |

(Compensating lens: third lens group)

| | f = 35.7 | f = 49.6 | f = 77.1 |
|---|---|---|---|
| D6 | 25.99 | 15.99 | 0.8 |
| D14 | 7.70 | 4.62 | 3.72 |

| | f = 35.7 mm | f = 49.6 mm | f = 77.1 mm |
|---|---|---|---|
| The amount of image shake ΔY when having tilted $\frac{1}{3}°$ by camera shake | 0.207 | 0.288 | 0.448 |
| Decentering sensitivity of compensating lens group | −0.586 | −0.929 | −1.350 |
| Required amount of decentering for image shake compensation of the compensating lens group | 0.354 | 0.310 | 0.331 |
| $\dfrac{(1 - \beta_{C0}) \cdot Z}{(1 - \beta_C)}$ | 1. | 0.876 | 0.937 |

Numerical Example 2:

| | f = 35 mm | f = 50 mm | f = 70 mm |
|---|---|---|---|
| $f_1 = -70.$ | $e_1 = 38.66$ | $e_1 = 22.36$ | $e_1 = 11.5$ |
| $f_2 = 27.16$ | $e_2 = 19.72$ | $e_2 = 17.86$ | $e_2 = 16$ |
| $f_3 = -49.5$ | | | |

(Compensating lens group: third lens group)

| | f = 35 mm | f = 50 mm | f = 70 mm |
|---|---|---|---|
| The amount of image shake ΔY when having tilted 1° by camera shake | 0.610 mm | 0.872 mm | 1.221 mm |
| Decentering sensitivity of compensating lens group | −0.5 | −0.714 | −1 |
| Required amount of decentering for image shake compensation of the compensating lens group | −1.221 mm | −1.221 mm | −1.221 mm |
| $\dfrac{(1 - \beta_{C0}) \cdot Z}{(1 - \beta_C)}$ | 1.0 | 1.0 | 1.0 |

Numerical Example 3:

| | f = 40 mm | f = 60 mm |
|---|---|---|
| $f_1 = -26.66$ | $e_1 = 21.41$ | $e_1 = 15.$ |
| $f_2 = 28.84$ | | |

(Compensating lens group: second lens group)

| | f = 40 mm | f = 60 mm |
|---|---|---|
| The amount of image shake ΔY when having tilted 1° by camera shake | 0.698 mm | 1.047 mm |
| Decentering sensitivity of compensating lens group | 2.5 | 3.25 |
| Required amount of decentering for image shake compensation of the compensating lens group | 0.279 mm | 0.322 mm |
| $\dfrac{(1 - \beta_{C0}) \cdot Z}{(1 - \beta_C)}$ | 1. | 1.154 |

Numerical Example 4:

| | f = 70 mm | f = 100 mm | f = 140 mm |
|---|---|---|---|
| $f_1 = 80$ | $e_1 = 21.9149$ | $e_1 = 15.5894$ | $e_1 = 10$ |
| $f_2 = -22.3404$ | $e_2 = 20.7801$ | $e_2 = 14.2971$ | $e_2 = 10$ |
| $f_3 = 28.5417$ | $e_3 = 13.6218$ | $e_3 = 9.6504$ | $e_3 = 15$ |
| $f_4 = -152.1154$ | | | |

(Compensating lens group: third lens group)

| | f = 70 mm | f = 100 mm | f = 140 mm |
|---|---|---|---|
| The amount of image shake ΔY when having tilted 1° by camera shake | 1.2219 mm | 1.7455 mm | 2.4437 mm |
| Decentering sensitivity of compensating lens group | 2.8 | 4. | 5.6 |
| Required amount of decentering for image shake compensation of the compensating lens group | 0.4364 mm | 0.4364 mm | 0.4364 mm |
| $\dfrac{(1 - \beta_{3W})\beta_{4W} \cdot Z}{(1 - \beta_3)\beta_4}$ | 1. | 1. | 1. |

Wherein "$\beta_{3W}$", "$\beta_{4W}$", "$\beta_3$" and "$\beta_4$" respectively are wide angle and focal length magnifications of the third and fourth lens groups.

According to the present invention, as has been described above, by specifying the optical action of each lens group of the variable magnification optical system, it is made possible that, if, as the optical system has tilted by the camera shake or the like, the tilting angle is the same, the amount of decentering by which the compensating lens group is moved in directions perpendicular to the optical axis to effect compensation is always the same regardless of variation of the focal length of the entire system. Therefore, the necessity of reading the information of the focal length, the necessity of performing computation, etc. no longer arise, thus permitting achievement of a variable magnification optical system having the capability of stabilizing the image, while still simplifying the control system and the drive system.

Also, even in a case where the reading mechanism for the information of the focal length and the computing mechanism are used, the interval at which the focal length information is read may be rough. Another advantage is that a variable magnification optical system of simple form which does not necessitate too high precision accuracy can be achieved.

While, in the embodiments described above, as the compensating optical system for stabilizing the image, the lens group having the optical power has been utilized, another embodiments using a variable angle prism are described below.

Figure 10:
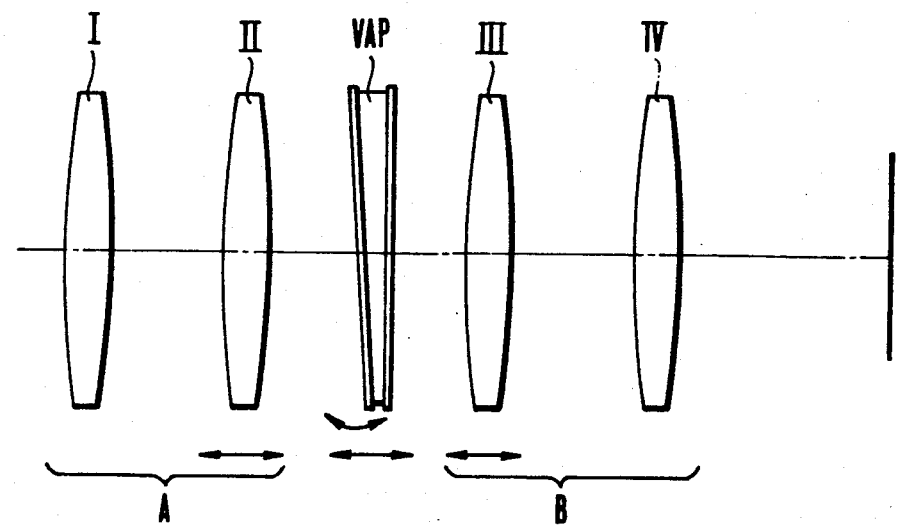
FIG. 10, FIG. 11, FIG. 12 and FIG. 13 are schematic diagrams of the main parts of numerical examples 5, 6, 7 and 8 of optical systems of the invention respectively.

FIG. 10 is a schematic view of the main parts of a numerical example 5 of an optical system of the invention. In FIG. 10, the system comprises a first lens group I for focusing, a second lens group II serving as the so-called variator for varying the image magnification, a third lens group III serving as the so-called compensator for compensating the shift of the image plane as the image magnification varies, and a fourth lens group IV serving as the so-called relay lens which is stationary during variation of the image magnification. A variable angle prism VAP having a surface movable through an angle E according to the invention is arranged in a space between the second lens group II and the third lens group III. The first lens group I and the second lens group II which lie on the object side of the variable angle prism VAP constitute a lens assembly A and the third lens group III and the fourth lens group IV which lie on the image plane side constitute a lens assembly B.

The variable angle prism VAP is arranged on the image plane side of the lens group that varies its image magnification as the focal length of the entire system varies, in the same figure, for example, the second lens group.

Next, in the variable magnification optical system according to the invention, a method of compensating for the image shake by a variable angle prism is shown.

When the variable magnification optical system tilts an angle $\theta$, the image on the image plane is deviated from the line of sight by an amount $\Delta Y_0$ in a reference focal length position, for example, at a wide-angle end. This amount of image shake $\Delta Y_0$ can be expressed as $$\Delta Y_0 = F_0 \cdot \tan \theta$$

where $F_0$ is the focal length of the entire system in the reference position.

As the entire system varies the image magnification, when it takes a certain focal length F, the amount of image shake $\Delta Y$ for the same angle of tilting $\theta$ on the image plane becomes $$\Delta Y = F \cdot \tan \theta$$

Denoting the zoom ratio by Z and representing it in $Z = F/F_0$, $$\Delta Y = Z \cdot F_0 \cdot \tan \theta$$

is obtained. Here, even when the tilting angle $\theta$ is the same, the amount of image shake $\Delta Y$ on the image plane becomes Z times that in the reference position.

Figure 14:
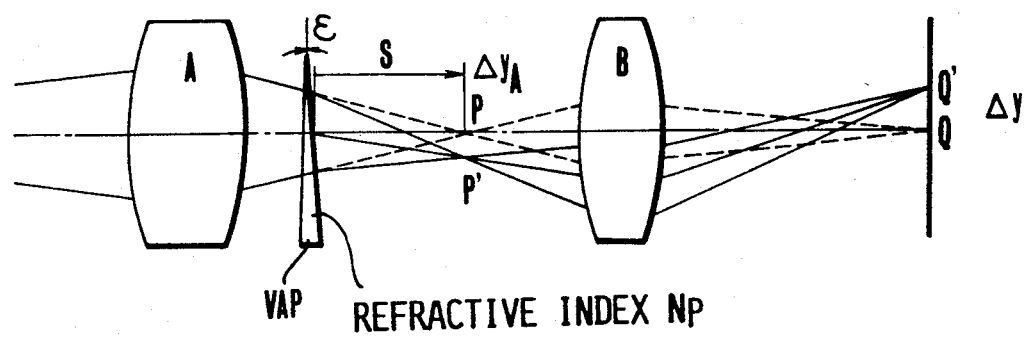
FIG. 14 is a diagram of geometry to explain the principle of image deflection by the variable angle prism.

Meanwhile, the amount of deflection $\Delta y$ of the image on the image plane by the variable angle prism, when the entire system has a focal length F, is produced in such a way that as shown in FIG. 14, an image formed by the lens assembly A lying on the object side of the variable angle prism VAP is deflected by $\Delta y_A$ by the variable angle prism and, after that, is relayed by the lens assembly B lying on the image plane side of the variable angle prism VAP at an image magnification BB. That is, denoting the vertex angle of the variable angle prism VAP by $\epsilon$, the amounts $\Delta y_A$ and $\Delta y$ can be expressed as $$\Delta y_A = S \cdot \tan\{(N_P - 1) \cdot \epsilon\}$$

$$\Delta y = (\Delta y_A) \cdot \beta_B = S \cdot \tan\{(N_P - 1) \cdot \epsilon\} \cdot \beta_B$$

Here, if the vertex angle $\epsilon$ is small, it gives $$\Delta y = S \cdot (N_P - 1) \cdot \epsilon \cdot \beta_B$$

Likewise, the amount of deflection $\Delta y_0$ of the image at the reference focal length, when the image forming magnification of the relay lens at the standard focal length is $\beta_{B0}$, can be expressed as $$\Delta y_0 \approx S_0 \cdot (N_P - 1) \cdot \epsilon \cdot \beta_{B0}$$

Therefore, as the variable angle prism changes a minute angle, the ratio of the amount of deflection $\Delta Y$ of the image to the amount of changed angle $\epsilon$, i.e., the decentering sensitivity l, also varies with variation of the focal length of the entire system. Since the decentering sensitivity $l_0$ in the reference state and the decentering sensitivity l(mm/rad) in the state having the focal length F can be expressed as $$l_0 = S_0 \cdot (N_P - 1) \cdot \beta_{B0}$$

$$l = S \cdot (N_P - 1) \cdot \beta_B$$

the required amounts of decentering $\epsilon_0$ and $\epsilon$ wherein $\epsilon_0$ and $\epsilon$ represent the decentering driving amount respectively at the standard focal length $F_0$ and at the focal length F, of the variable angle prism for compensation for the image shake by the above-described amounts of deflection $\Delta Y_0$ and $\Delta Y$ are obtained by $$\begin{aligned}
\epsilon_0 &= \Delta Y_0 / l_0 \\
&= F_0 \cdot \tan\Theta / \{S_0 \cdot (N_P - 1) \cdot \beta_{B0}\} \\
\epsilon &= \Delta Y / l \\
&= Z \cdot F_0 \cdot \tan\Theta / \{S \cdot (N_P - 1) \cdot \beta_B\}
\end{aligned}$$

Therefore, in order that when the angle the variable magnification optical system is tilted by the camera shake is the same angle, the amount of decentering of the variable angle prism has, despite variation of the focal length of the entire system, to be made always the same, each lens group may be so constructed and the image magnification may be so varied as to satisfy the following relationship:

$$S \cdot \beta_B / Z = S_0 \cdot \beta_{B0}$$

In actual practice, even if this relationship has an error of about 30%, the reading mechanism for the information of the focal length and the computing mechanism may be constructed in a very simple form with the tolerances, too, having not to be much rigorous. Hence, the following condition is obtained:

$$0.7 < \frac{S_0 \cdot \beta_{B0} \cdot Z}{S \cdot \beta_B} < 1.3 \quad (2)$$

where if the lens assembly B is not arranged, $\beta_{B0} = \beta_B = 1$)

With this, the focal length of the entire system is varied under the following condition:

$$\beta_A \cdot \beta_B / (\beta_{A0} \cdot \beta_{B0}) = Z$$

where $\beta_A$ and $\beta_{A0}$ are the image magnifications of the lens assembly A lying on the object side of the variable angle prism.

Figure 11:
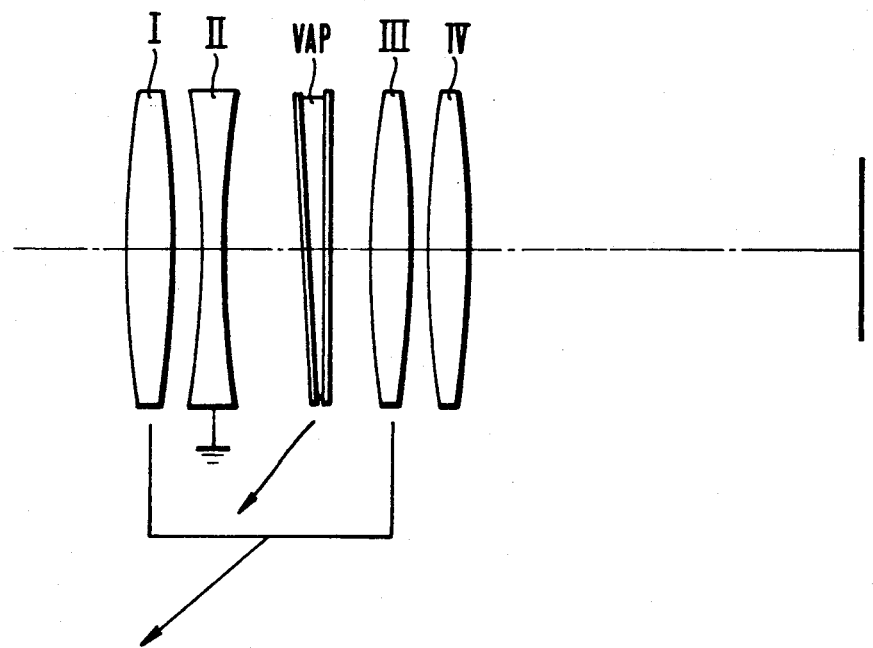
Figure 12:
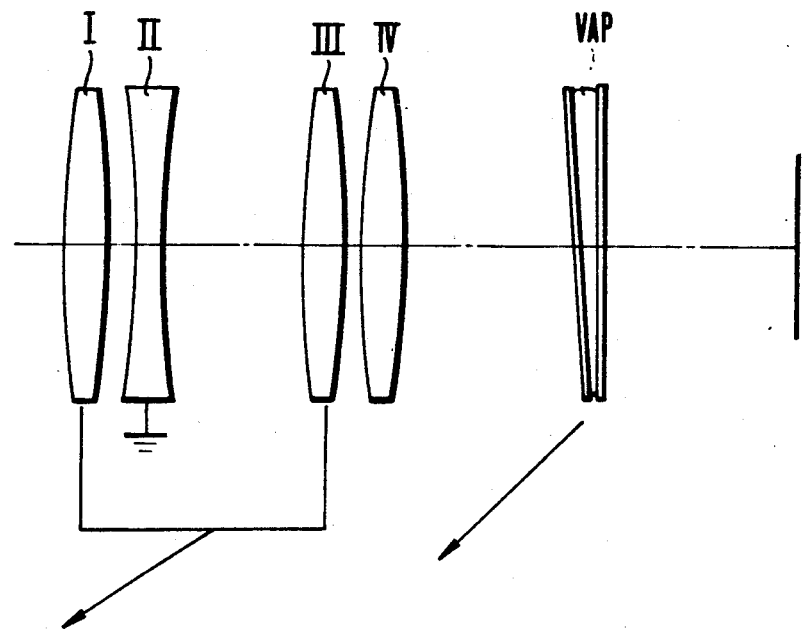
Figure 13:
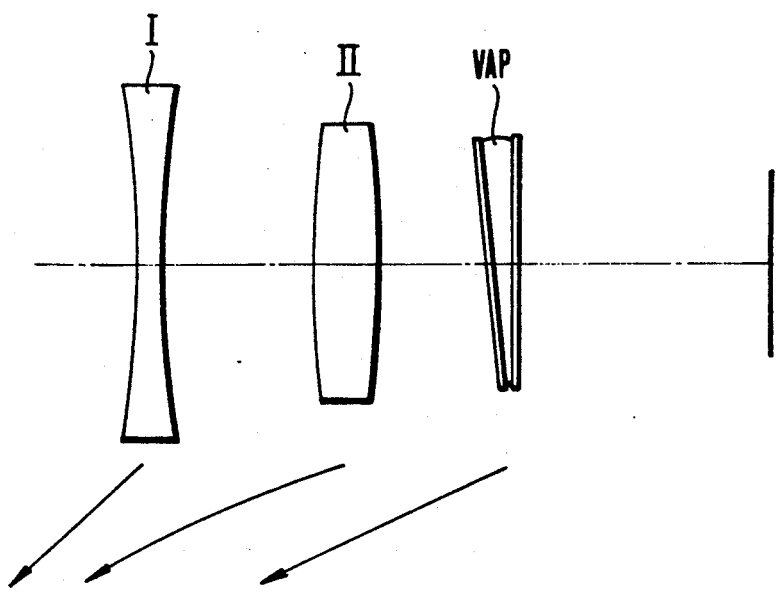

FIG. 11, FIG. 12 and FIG. 13 are schematic views of the main parts of numerical examples 6, 7 and 8 of optical systems of the invention respectively.

In the numerical example 6 of FIG. 11, the variable magnification optical system is constructed with, from front to rear, a first lens group I of positive refractive power, a second lens group II of negative refractive power, a variable angle prism VAP, a third lens group III of positive refractive power and a fourth lens group IV of positive refractive power.

The second lens group II and the fourth lens group IV are fixed, and the first lens group I and the third lens group III are moved in unison toward the object side to vary the focal length from the wide-angle end to the telephoto end.

Also, the variable angle prism VAP is set in a space between the second lens group and the third lens group and made to move toward the object side either independently or in unison with other lens groups as the focal length varies from the wide-angle end to the telephoto end.

In the present embodiment, the variable angle prism is constructed with the provision of a transparent silicon rubber interior so that the refractive index of the variable angle prism has n=1.40586. Taking the wide-angle end of the variable magnification optical system as the reference state, the decentering sensitivity in the reference state gets $l_0 = 20.6904$ mm/rad. The decentering sensitivities at the focal lengths in the telephoto end and the intermediate become 30.4754 mm/rad and 41.601 mm/rad respectively.

The value of "$(S_0 \cdot \beta_{B0} \cdot Z)/(S \cdot \beta_B)$" is "1." at each of the focal lengths in the telephoto end and the intermediate. Therefore, the compensation angle of the variable angle prism for the tilting of the variable magnification optical system can be made almost coincident over the entire range of variation of the focal length.

In the present embodiment, the variable angle prism VAP may otherwise be arranged to be stationary as in unified form with the lens group that is stationary during variation of the focal length, for example, the second lens group either on the object side or on the image plane side thereof.

The use of such a construction and arrangement, because of its allowing the variable angle prism and the actuator for driving the variable angle prism to be fixed in the axial position during variation of the focal length, leads to a possibility of simplifying the structure of construction and, also because of its allowing the backlash to be minimized, to a possibility of stably driving them.

The numerical example 7 of FIG. 12 is obtained from the numerical example 6 of FIG. 11 by arranging the variable angle prism VAP on the image plane side of the fourth lens group instead of arranging it in the space between the second and third lens groups. The variable angle prism, when the focal length is varied from the wide-angle end to the telephoto end, is made to move toward the object side either independently of, or together with, other lens groups.

In the present embodiment, the refractive index of the variable angle prism has n=1.40586, and taking the wide-angle end of the variable magnification optical system as the reference state, the decentering sensitivity $l_0$ in the reference state gets 14.5113 mm/rad. The decentering sensitivities at the focal lengths in the telephoto end and the intermediate become respectively 21.374 mm/rad and 24.739 mm/rad. "$(S_0 \cdot \beta_{B0} \cdot Z)/(S \cdot \beta_B)$" has values of "1." and "1.18" at the focal lengths in the telephoto end and the intermediate respectively.

Therefore, the compensation angle of the variable angle prism for the tilting of the variable magnification optical system can be made almost coincident.

In the present embodiment, the variable angle prism may be combined with one or more lens groups that moves or move axially during variation of the focal length so that it moves in unison therewith.

According to this, the structure of construction can be simplified and the motion can be made smooth.

In the numerical example 8 of FIG. 13, the variable magnification optical system is constructed with, from front to rear, a first lens group I of negative refractive power, a second lens group II of positive refractive power, and a variable angle prism VAP.

The first lens group I and the second lens group II are moved both toward the object side as the focal length is varied from the wide-angle end to the telephoto end. Also, the variable angle prism, when the focal length is varied from the wide-angle end to the telephoto end, is made to move toward the object side either independently of, or in unison with, the other lens groups.

In the present embodiment, the refractive index of the variable angle prism has n=1.40586 and, taking the wide-angle end of the variable magnification optical system as the reference state, the decentering sensitivity in the reference state gets $l_0 = 16.03$ mm/rad. The decentering sensitivities at the focal lengths in the telephoto end and the intermediate become respectively 29.9 mm/rad and 36.06 mm/rad. "$(S_0 \cdot \beta_{B0} \cdot Z)/(S \cdot \beta_B)$" has a value of "1." at each of the focal lengths in the telephoto end and the intermediate. Therefore, the compensation angle of the variable angle prism for the tilting of the variable magnification optical system can be made coincident. This obviates the necessity of reading and computing information of the focal length to adjust the compensation angle of the variable angle prism.

Next, the numerical data of the paraxial power arrangements of the numerical examples 6, 7 and 8 of the invention are shown. In the numerical examples 6, 7 and 8, fi is the focal length of the i-th lens group, and ei is the interval between the principal points of the i-th lens group and the (i+1)st lens group, where if the variable angle prism lies within the lens system, it represents the spacing between the adjacent two of the lens groups.

| Numerical Example 6: | | | |
|---|---|---|---|
| Focal length | $f = 72.73$ mm | $f = 107.13$ mm | $f = 146.24$ mm |
| $f_1 = 143.98$ | $e_1 = 10.25$ | $e_1 = 25.1$ | $e_1 = 36.74$ |
| $f_2 = -48.07$ | $e_2 = 18.41$ | $e_2 = 12.17$ | $e_2 = 5.11$ |
| VAP | $e_2' = 17.18$ | $e_2' = 8.57$ | $e_2' = 4.$ |
| $f_3 = 59.13$ | $e_3 = 46.73$ | $e_3 = 61.58$ | $e_3 = 73.21$ |
| $f_4 = 291.58$ | | | |
| Focal length | $f = 72.73$ mm | $f = 107.13$ mm | $f = 146.24$ mm |
| The amount of image shake $\Delta Y$ when having tilted 1° by camera shake | 1.2695 mm | 1.8699 mm | 2.5526 mm |
| Compensation sensitivity of VAP | 20.6904 mm/rad | 30.4754 mm/rad | 41.601 mm/rad |
| Required amount of driving of VAP for image shake compensation | 0.061 rad (3.51 deg) | 0.061 rad (3.51 deg) | 0.061 rad (3.51 deg) |
| $\dfrac{S_0 \cdot \beta_{B0} \cdot Z}{S \cdot \beta_B}$ | 1. | 1. | 1. |

| Numerical Example 7: | | | |
|---|---|---|---|
| Focal length | $f = 72.73$ mm | $f = 107.13$ mm | $f = 146.24$ mm |
| $f_1 = 143.98$ | $e_1 = 10.25$ | $e_1 = 25.1$ | $e_1 = 36.74$ |
| $f_2 = -48.17$ | $e_2 = 35.59$ | $e_2 = 20.74$ | $e_2 = 9.11$ |
| $f_3 = 59.13$ | $e_3 = 46.73$ | $e_3 = 61.58$ | $e_3 = 73.21$ |
| $f_4 = 291.58$ | $e_4 = 27.2$ | $e_4 = 10.29$ | $e_4 = 2.$ |
| VAP | | | |
| Focal length | $f = 72.73$ mm | $f = 107.13$ mm | $f = 146.24$ mm |
| The amount of image shake $\Delta Y$ when having tilted 1° by camera shake | 1.2695 mm | 1.8699 mm | 2.5526 mm |
| Compensation sensitivity of VAP | 14.5113 mm/rad | 21.374 mm/rad | 24.739 mm/rad |
| Required amount of driving of VAP for image shake compensation | 0.087 rad (5 deg) | 0.087 rad (5 deg) | 0.103 rad (5.89 deg) |
| $\dfrac{S_0 \cdot \beta_{B0} \cdot Z}{S \cdot \beta_B}$ | 1. | 1. | 1. |

| Numerical Example 8: | | | |
|---|---|---|---|
| Focal length | $f = 35$ mm | $f = 50$ mm | $f = 70$ mm |
| $f_1 = -35$ | $e_1 = 27.67$ | $e_1 = 18.27$ | $e_1 = 12$ |
| $f_2 = 31.33$ | $e_2 = 23.17$ | $e_2 = 19.67$ | $e_2 = 15$ |
| VAP | | | |
| Focal length | $f = 35$ mm | $f = 50$ mm | $f = 70$ mm |
| The amount of image shake $\Delta Y$ when having tilted 1° by camera shake | 0.6109 mm | 0.8728 mm | 1.2219 mm |
| Compensation sensitivity of VAP | 16.03 mm/rad | 22.9 mm/rad | 36.06 mm/rad |
| Required amount of driving of VAP for image shake compensation | 0.038 rad (2.18 deg) | 0.038 rad (2.18 deg) | 0.038 rad (2.18 deg) |
| $\dfrac{S_0 \cdot \beta_{B0} \cdot Z}{S \cdot \beta_B}$ -continued | 1.0 | 1.0 | 1.0 |

According to the present invention, by specifying the variable magnification optical system and the variable angle prism as has been described above, despite variation of the focal length of the variable magnification optical system, when the variable magnification optical system has tilted by camera shake or the like, the required amount of decentering of the variable angle prism for the tilting, if the tilting angle is the same, can be made to be always the same, thereby obviating the necessities of reading information of the focal length and computing. Hence a variable magnification optical system having the capability of stabilizing the image while still permitting simplification of the control system and drive system to be achieved can be realized.

Another advantage is that even when the reading mechanism for the information of the focal length and the computing mechanism are in use, the interval at which the focal length information is read may be rough. Still another advantage is that a variable magnification optical system of simple form which does not require much rigorous tolerances can be realized.

What is claimed is:

1. An optical system having an optical axis comprising:

a front lens group;

a variable magnification lens group, whose image magnification varies due to a process of zooming, located on the image side of said front lens group with at least one lens group included in said variable magnification lens group being a compensating lens group capable of decentering relative to said optical axis to stabilize an image;

a drive means to decenter said compensating lens group, wherein letting a focal length of the optical system and an image magnification of said compensating lens group in a first zoom position be denoted by $F_0$ and $\beta_{C0}$, respectively, and a focal length of the optical system and an image magnification of said compensating lens group in a second zoom position be denoted by F and $\beta_C$, respectively, wherein, further, if a rear lens group is arranged on the image side of said compensating lens group, image magnifications of said rear lens group in the first zoom position and the second zoom position are denoted by $\beta_{D0}$ and $\beta_D$, and the zoom ratio is denoted by Z and putting $Z=F/F_0$, the following condition is satisfied:

$$0.8 < \frac{(1-\beta_{C0}) \cdot \beta_{D0} \cdot Z}{(1-\beta_C) \cdot \beta_D} < 1.2$$

and wherein further if said rear lens group is not arranged, the values of $\beta_{D0}$ and $\beta_D$ become $\beta_{D0}=\beta_D=1$, and the following condition then is satisfied:

$$0.8 < \frac{(1-\beta_{C0}) \cdot Z}{(1-\beta_C)} < 1.2.$$

2. An optical system according to claim 1, wherein said front lens group and said variable magnification lens group move along the optical axis for zooming, and said variable magnification lens group is made to decenter by said drive means to stabilize an image.

3. An optical system according to claim 2, satisfying the following condition:

$$-\frac{0.2}{Z_{T\Theta}-1.2} < \frac{1}{\beta_{2T}} < \frac{0.2}{Z_{T\Theta}-0.8} \quad (Z_{T\Theta} > 1)$$

where $F_\Theta$ is a focal length at the most wide-angle end optical system at which an image shake is compensated for, $\beta_{2\Theta}$ is an image magnification of said compensating lens group at the focal length $F_\Theta$, $F_T$ is a focal length at the most telephoto end, and $\beta_{2T}$ is an image magnification of said compensating lens group at the focal length $F_T$, and $Z_{T\Theta}$ is $F_T/F_\Theta$.

4. An optical system according to claim 1, wherein said optical system has, in the order from the object side, said front lens group and said variable magnification lens group comprising a first, a second, and a third lens group wherein at least one group moves during zooming and wherein said second lens group is made to decenter to stabilize an image.

5. An optical system having an optical axis, comprising:

a front lens group;

a variable magnification group whose image magnification varies due to a process of zooming; and variable angle prism means positioned inside or to the rear of said variable magnification lens group, said prism means comprising a movable surface for stabilizing an image, wherein letting a focal length of the optical system and a distance from the movable surface of said prism means to an image point of all those lens groups positioned on the object side of said variable angle prism means in a first zooming position be denoted by $F_0$ and $S_0$, respectively, and a focal length of the optical system and a distance from the movable surface of said prism means to an image point of all those lens groups positioned on the object side of said variable angle prism means in a second zooming position are denoted by F and S, respectively, where if a rear lens group is arranged on the image side of said variable angle prism means, image magnifications of said rear lens group in the first zooming position and the second zooming position are denoted by $\beta_{B0}$ and $\beta_B$, respectively, and the zoom ratio is denoted by Z and putting $Z=F/F_0$, the following condition is satisfied:

$$0.7 < \frac{S_0 \cdot \beta_{B0} \cdot Z}{S \cdot \beta_B} < 1.3$$

6. An optical system according to claim 5, wherein said variable angle prism means moves along said optical axis to shift the optical system from said first zooming position to said second zooming position.

7. An optical system according to claim 5, wherein said variable angle prism means is stationary relative to said optical axis, and a lens group whose image magnification varies as the focal length varies is arranged on the image plane side of said variable angle prism means.

8. An optical device having an optical axis, comprising:

a front lens group and a compensation optical means that is located on the image side of said front lens group, that is variable in image magnification due to a process of zooming and is arranged to decenter relative to the optical axis in order to stabilize an image;

wherein letting a focal length of the optical device and an image magnification of said compensating optical means in a first zooming position be denoted by $F_0$ and $\beta_{C0}$ respectively, and a focal length of the optical device and an image magnification of said compensating optical means in a second zooming position be denoted by F and $\beta_C$, respectively, wherein, further, if a rear lens group is arranged on the image side of said compensating optical means, image magnifications of said rear lens group in the first zooming position and a second zooming position are denoted by $\beta_{D0}$ and $\beta_D$, respectively, and the zoom ratio is denoted by Z and putting the zoom ratio $Z=F/F_0$, the following condition is satisfied:

$$0.8 < \frac{(1-\beta_{C0}) \cdot \beta_{D0} \cdot Z}{(1-\beta_C) \cdot \beta_D} < 1.2$$

and wherein if a rear lens group is not arranged, then the values of $\beta_{D0}$ and $\beta_D$ become $\beta_{D0}=\beta_D=1$ and the following condition is satisfied:

$$0.8 < \frac{(1 - \beta_{CO}) \cdot Z}{(1 - \beta_C)} < 1.2.$$

9. An optical device having an optical axis, comprising:

a front lens group, a zoom lens group located on the image side of said front lens group that is variable in image magnification due to a process of zooming, and a variable angle prism means that is located on the image side of said front lens group;

wherein letting a focal length of the optical device and a distance from a movable surface of said variable angle prism means to an image point of those lens groups positioned on the object side of said variable angle prism means in a first zooming position be denoted by $F_0$ and $S_0$, respectively, and a focal length of the optical device and a distance from the movable surface of said variable angle prism means to the image point of those front lens groups positioned on the object side of said variable angle prism means in a second zooming position are denoted by F and S, respectively, wherein, further, if a rear lens group is arranged on the image plane side of said variable angle prism means, image magnifications of said rear lens group in the first and second zooming positions are denoted by $\beta_{B0}$ and $\beta_B$, respectively, and the zoom ratio is denoted by Z and putting the zoom ratio $Z = F/F_0$, the following condition is satisfied:

$$0.7 < \frac{S_0 \cdot \beta_{B0} \cdot Z}{S \cdot \beta_B} < 1.3$$

and wherein if a rear lens group is not arranged, then the values of $\beta_{B0}$ and $\beta_B$ become $\beta_{B0} = \beta_B = 1$ and the following condition is satisfied:

$$0.7 < \frac{S_0 \cdot Z}{S} < 1.3.$$

* * * * *

UNITED STATES PATENT AND TRADEMARK OFFICE
CERTIFICATE OF CORRECTION

PATENT NO. : 5,182,671　　　　　　　Page 1 of 2
DATED : January 26, 1993
INVENTOR(S) : NOZOMU KITAGISHI, ET AL.

It is certified that error appears in the above-identified patent and that said Letters Patent is hereby corrected as shown below:

Title page,
　　item [30]:
　　　Line 2, "Sep. 19, 1988 [JP] Japan.....3-234093" should read --Sep. 19, 1988 [JP] Japan.....63-234093--.

Title page,
　　item [56]:
under Other Publications, col. 2, Ser. No. 07/261/231 --should be --Ser. No. 07/261,231--.

Column 3:
　　　Line 17, Q: "it a" should read --it to a--??
　　　Line 29, "Yo = $F_0 \cdot \tan \theta$" should read --$\Delta$ Yo = $F_0 \cdot \tan \theta$--.

Column 4:
　　　Line 6, "$E_0 = \Delta Y_0/S_0 = F_0 \cdot \tan \theta/C1-\beta_{c0}) \beta_{D0}$" should read --$E_0 = \Delta Y_0/S_0 = F_0 \cdot \tan \theta/(1-\beta_{c0}) \beta_{D0}$--.

Column 8:
　　　Line 8, "includes" should read --include--.

Column 11:
　　　Line 29, "another" should read --other--.

Column 12:
　　　Line 55, "and $\epsilon$ should read --and $\epsilon$,--.

Column 13:
　　　Line 23, "where" should read --(where--.
　　　Line 24, "$\beta_{B0}=\beta_B=1$)" should read --$\beta_{B0}=\beta_B=1$).--

UNITED STATES PATENT AND TRADEMARK OFFICE
CERTIFICATE OF CORRECTION

PATENT NO. : 5,182,671
DATED : January 26, 1993
INVENTOR(S) : NOZOMU KITAGISHI, ET AL.

It is certified that error appears in the above-identified patent and that said Letters Patent is hereby corrected as shown below:

<u>Column 17</u>:
 Line 48, "end" should read --end of said--.

<u>Coumn 18</u>:
 Line 25, "$0.7 < \frac{S_0 \cdot \beta_{80} \cdot Z}{S \cdot \beta_B} < 1.3$" should read --$0.7 < \frac{S_0 \cdot \beta_{80} \cdot Z}{S \cdot \beta_B} < 1.3$.--.

Signed and Sealed this

Fifteenth Day of March, 1994

Attest:

BRUCE LEHMAN

*Attesting Officer*    *Commissioner of Patents and Trademarks*